United States Patent
Oohira

(10) Patent No.: US 7,678,853 B2
(45) Date of Patent: Mar. 16, 2010

(54) HIGHLY DIELECTRIC ELASTOMER COMPOSITION AND DIELECTRIC ANTENNA

(75) Inventor: Kouya Oohira, Iwata (JP)

(73) Assignee: NTN Corporation, Osaka (JP)

( * ) Notice: Subject to any disclaimer, the term of this patent is extended or adjusted under 35 U.S.C. 154(b) by 423 days.

(21) Appl. No.: 11/629,646

(22) PCT Filed: Jun. 15, 2005

(86) PCT No.: PCT/JP2005/010949

§ 371 (c)(1),
(2), (4) Date: Dec. 15, 2006

(87) PCT Pub. No.: WO2005/123841

PCT Pub. Date: Dec. 29, 2005

(65) Prior Publication Data

US 2007/0182640 A1    Aug. 9, 2007

(30) Foreign Application Priority Data

Jun. 16, 2004 (JP) ............................ P2004-177969
Jul. 30, 2004 (JP) ............................ P2004-222910
Dec. 10, 2004 (JP) ............................ P2004-358623

(51) Int. Cl.
*C08K 3/10* (2006.01)

(52) U.S. Cl. ................. 524/403; 343/785; 343/907; 501/138; 501/139

(58) Field of Classification Search ............ 524/403; 501/138, 139; 343/785, 907
See application file for complete search history.

(56) References Cited

U.S. PATENT DOCUMENTS 5,677,029 A * 10/1997 Prevorsek et al. ........... 428/113
5,962,122 A * 10/1999 Walpita et al. ............. 428/325
6,686,406 B2 * 2/2004 Tomomatsu et al. ........ 524/403

FOREIGN PATENT DOCUMENTS

| JP | 06-029727   | 2/1994 |
| JP | 07-066620   | 3/1995 |
| JP | 09-031244 A | 2/1997 |

(Continued)

OTHER PUBLICATIONS

International Search Report, Oct. 11, 2005.
Electronic Monthly, Jul. 1998, pp. 16-19.

*Primary Examiner*—Peter D Mulcahy
(74) *Attorney, Agent, or Firm*—Headman & costigan; James V. Costigan

(57) ABSTRACT

The present invention provides a highly dielectric elastomer composition which shows a high dielectric constant in a wide temperature range from low to high temperature and has a low dielectric loss tangent, and a dielectric antenna composed of the highly dielectric elastomer composition. A dielectric antenna including a molding of a highly dielectric elastomer composition composed of an elastomer and a highly dielectric ceramic powder mixed with the elastomer and an electrode formed on the molding. The highly dielectric ceramic powder of barium titanate.neodymium ceramic has a temperature coefficient α(unit: 1/° C.) of a dielectric constant of the ceramic powder on 25° C. standard ranging from $-200 \times 10^{-6}$ to $100 \times 10^{-6}$ over a temperature range from $-40°$ C. to $100°$ C. The dielectric constant of the highly dielectric elastomer composition is $\geq 7$ and a dielectric loss tangent thereof is $\leq 0.01$.

5 Claims, 3 Drawing Sheets

FOREIGN PATENT DOCUMENTS

| | | |
|---|---|---|
| JP | 2001-143531 | 5/2001 |
| JP | 2003-078322 | 3/2003 |
| JP | 2003-342478 | 3/2003 |
| JP | 2003-128930 | 5/2003 |
| JP | 2003-138067 | 5/2003 |
| JP | 2004-059702 | 2/2004 |

* cited by examiner

HIGHLY DIELECTRIC ELASTOMER COMPOSITION AND DIELECTRIC ANTENNA

TECHNICAL FIELD

The present invention relates to a highly dielectric elastomer composition and an electrode-provided dielectric antenna mounted on a molding of the highly dielectric elastomer composition, and more particularly to a highly dielectric elastomer composition for use in electric and electronic parts used at a high-frequency band and the dielectric antenna.

BACKGROUND ART

In recent years, with a conspicuous spread of a patch antenna for use in a cellular phone, a cordless phone, a RFID, and the like, and a lens antenna for use in a radio telescope, a millimeter-wave radar, and the like, and with an outstanding progress of a satellite communication apparatus, there is a growing demand for making the frequency of a communication signal high and communication apparatuses compact.

As the dielectric constant of a material of an antenna incorporated in the communication apparatus becomes higher, it is possible to make the communication signal higher and the communication apparatus compact. The dielectric constant is a parameter indicating the degree of a polarization inside the dielectric. Therefore when the material of the antenna having a high dielectric constant can be used, it is possible to make the frequency of the communication signal high and hence shorten circuits and make the communication apparatus compact.

Conventionally, as a highly dielectric elastomer, the fibrous metal salt of titanic acid and/or the composite fiber of the metal salt of titanic acid and the amorphous titanium oxide integrally enclosing the fibrous metal salt of titanic acid therewith to form the integrated composite fiber are known. The integrated composite fiber having the mol ratio between metals M and Ti in the range of 1.005 to 1.5 is mixed with the elastomer at 5 to 80 wt % with respect to the total weight of the highly dielectric elastomer composition to allow the highly dielectric elastomer composition to have a high permittivity (patent document 1).

300 to 500 parts by weight of barium titanate powder having a dielectric constant not less than 2000 in the range of a room temperature to 90° C. is mixed with 100 parts by weight of ethylene propylene rubber or the like crosslinked with the peroxide to form the high-permittivity rubber composition having a dielectric constant set to not less than 10 and preferably not less than 20 (patent document 2).

But in the above-described highly dielectric elastomer composition of the example (patent document 1) composed of the elastomer and the composite fiber mixed therewith, it is difficult to select the kind of the elastomer and the composite fiber, and owing to the directionality of the fibrous filling material, the molding of the highly dielectric elastomer composition is anisotropic. Thereby the linear expansion and the dielectric characteristic become unstable. Thus it is difficult to obtain a material having a high permittivity and a low dielectric loss tangent.

The high-permittivity rubber composition (patent document 2) is an insulating material which is disposed to relax an electric field mismatching which is liable to be generated at a connection position of power cables, a termination portion thereof, and the like. As the property of the barium titanate powder, it has a large dielectric loss tangent. Thus the barium titanate powder is unsuitable for an electronic part such the material of an antenna.

As the use mode of the communication apparatus becomes diversified, the communication apparatus is demanded to have little variations in the electrical characteristic in the range from a low temperature to a high temperature. When the conventional highly dielectric elastomer composition is used for an electronic part that is used in a wide temperature region, the electrical characteristic of the electronic part changes greatly.

Further, to comply with the demand of miniaturization of the communication apparatus, an antenna body is formed by molding a dielectric resin material which has a small specific gravity and a small dielectric loss and is advantageous for obtaining a high gain, and an electrode is formed on the obtained molding to form a dielectric antenna.

As a conventional dielectric antenna having an electrode plated with a metal, the rubber-like elastic material soluble in the inorganic filler and in the solvent is mixed with the styrene polymer having the syndiotactic structure (SPS) to obtain the composite dielectric material, the surface of which is roughened by etching treatment to plate the surface at an improved degree. The composite dielectric material is used as an antenna (patent document 3). A resin difficult to be plated and a resin easy to be plated are used in combination. The resin easy to be plated is used on the surface on which the electrode is formed so that it is used as the material of the antenna (patent document 4). Further the electrode is made of the copper foil pattern (patent document 5). In addition, the electrode is formed on the antenna body made of ceramics by screen printing (patent document 6).

When a resin material is used as a dielectric substrate of an antenna, it is necessary to form an electrode. As methods of forming the electrode, a metal plating method, a metal foil-bonding method, and screen printing method, and the like are known. Metal plating treatment is difficult to be made. Further the metal plating treatment has a problem that a specific foundation treatment is required, as disclosed in the patent documents 3 and 4. Further when the electrode is formed by plating treatment, the electrode has a low degree of adhesion to the material of the antenna to a low degree after the foundation treatment is made. Thus there is a fear that the dielectric characteristic deteriorates. Thus the metal plating processing is unfavorable. When the copper foil is used as the electrode, as disclosed in the patent document 5, the electrode is liable to be oxidized. Thus when a working temperature rises, the electrode is oxidized and the permittivity decreases. The screen printing is applied to form the electrode on the antenna body made of ceramics but not applied to the antenna body made of the elastomer. Screen printing paste used to form the electrode of the antenna made of ceramics contains silica. A product including the printed paste is calcined at a high temperature of 500 to 600° C. to vitrify it so that Ag powder is fixed. Because the elastomer is decomposed at a high temperature of 500° C., the screen printing method cannot be used for the antenna composed of the elastomer.

Patent document 1: Japanese Patent Application Laid-Open No. 09-031244
Patent document 2: Japanese Patent Application Laid-Open No. 2003-138067
Patent document 3: Japanese Patent Application Laid-Open No. 2001-143531
Patent document 4: Japanese Patent Application Laid-Open No. 2003-078322
Patent document 5: Japanese Patent Application Laid-Open No. 07-066620

Patent document 6: Japanese Patent Application Laid-Open No. 06-029727

DISCLOSURE OF THE INVENTION

Problem to be Solved by the Invention

It is an object of the present invention to provide a dielectric antenna which shows a high dielectric constant in a wide temperature range from a low temperature to a high temperature and has a low dielectric loss tangent. It is another object thereof to provide a highly dielectric elastomer composition for producing the dielectric antenna.

Means for Solving the Problem

A highly dielectric elastomer composition of the present invention includes an elastomer and a highly dielectric ceramic powder mixed with the elastomer. The highly dielectric ceramic powder has a temperature coefficient α (unit: 1/° C.) of a dielectric constant of the ceramic powder on 25° C. standard ranging from $-200 \times 10^{-6}$ to $100 \times 10^{-6}$ over a temperature range from $-40°$ C. to $100°$ C.

In the present invention, the temperature coefficient α (1/° C.) of the dielectric constant is a value defined by $\alpha = (\in_r(t) - \in_r(25))/[(\in_r(25))(t-25)]$. Herein $\in_r(t)$ and $\in_r(25)$ indicate the dielectric constant at a given temperature t° C. in the range of $-40°$ C. to $100°$ C. and the dielectric constant at 25° C. respectively.

At a frequency of 1 GHz and a temperature of 25° C., the dielectric constant of the highly dielectric elastomer composition is not less than seven and a dielectric loss tangent thereof is not more than 0.01. In the highly dielectric elastomer composition, the highly dielectric ceramic powder is a barium titanate.neodymium ceramic powder. The elastomer contains a non-polar olefin unit as a constituent unit thereof. The elastomer is an ethylene propylene rubber.

A dielectric antenna of the present invention includes a molding of the highly dielectric elastomer composition and an electrode formed on the molding. Particularly, the electrode is made of a plated copper foil.

The electrode is formed by screen-printing by using conductive paste.

Effect of the Invention

In the highly dielectric elastomer composition of the present invention, the highly dielectric ceramic powder in which the temperature coefficient α (unit: 1/° C.) of the dielectric constant is in the range of $-200 \times 10^{-6}$ to $100 \times 10^{-6}$ in the temperature range of $-40°$ C. to $100°$ C. is mixed into the elastomer. Particularly the barium titanate.neodymium ceramic powder is used. Owing to these aspects, it is possible to obtain the elastomer composition whose dielectric constant is less dependent on temperature than conventional highly dielectric elastomer compositions. Consequently it is possible to obtain electric and electronic parts such as an antenna which can be used for a high-frequency communication apparatus in a high-frequency band and wide temperature range.

The dielectric antenna of the present invention is obtained by bonding the copper foil plated as the electrode thereof to the molding of the highly dielectric elastomer composition formed as the body thereof or by bonding the conductive paste thereto by screen printing. Consequently it is possible to make the antenna compact. Further because the antenna has a high permittivity, it is possible to realize a high-frequency communication apparatus in which the antenna is incorporated and make communication apparatus compact.

BEST MODE FOR CARRYING OUT THE INVENTION

When the highly dielectric elastomer composition is used as a material for an antenna, with a change of a working temperature, the dielectric constant of the elastomer composition changes. As a result, the resonance frequency of the antenna shifts. For example, it is known that when the dielectric constant of the elastomer composition drops with a rise of temperature, the resonance frequency of the antenna shifts to a high-frequency side. The amount of the shift can be computed with reference to equations (1) through (6) shown below.

In the case of a patch antenna, supposing that an operating wavelength is λ, a pattern length A of a transmitting and receiving portions is expressed by the equation (1) shown below:

$$A = (½) \times \lambda \tag{1}$$

Supposing that the dielectric constant of the material of the antenna is $\in_r$, a wavelength $\lambda_0$ which passes through the material of the antenna is expressed by the equation (2) shown below owing to a wavelength-reducing effect:

$$\lambda_0 = (\in_r)^{(-1/2)} \times \lambda \tag{2}$$

Therefore when the above-described material of the antenna is used, the pattern length A of the transmitting and receiving portions is expressed by the equation (3) shown below:

$$A = (\in_r)^{(-1/2)} \times (½) \times \lambda \tag{3}$$

Supposing that V is $300 \times 10^6$ m/second, a frequency f is expressed by the equation (4) shown below:

$$f = V/\lambda \tag{4}$$

In designing the patch antenna with reference to the fundamental equations (1) through (4), supposing that an operating frequency is $f_1$, that a dielectric constant at a room temperature is $\in_1$, and that a dielectric constant after temperature changes by ΔT is $\in_2$, a resonance frequency $f_2$ of the antenna is expressed by the equation (5) shown below:

$$f_2 = (\in_1/\in_2)^{(1/2)} \times f_1 \tag{5}$$

Supposing that a temperature change is ΔT, a shift Δf of the resonance frequency is expressed by the equation (6) shown below:

$$\Delta f = f_2 - f_1 \tag{6}$$

When the change of the dielectric constant with respect to temperature is large, the shift Δf of the resonance frequency is large from the equations (5) and (6). This is practicably unfavorable. When the resonance frequency changes ±10% with respect to the operating frequency, the property of the antenna deteriorates greatly, which is unpreferable.

As described above, it is preferable that the highly dielectric elastomer composition has a small temperature coefficient α of the dielectric constant thereof, when it is used as the material of the antenna.

By mixing the highly dielectric ceramic powder whose dielectric constant is dependent on temperature to a low extent with the elastomer, it is possible to reduce the temperature coefficient α of the dielectric constant of the highly dielectric elastomer composition.

In the present invention, by using the highly dielectric ceramic powder having the temperature coefficient α in the range of $-200\times10^{-6} \leq \alpha \leq 100\times10^{-6}$, favorably $-100\times 10^{-6} \leq \alpha \leq 30\times10^{-6}$, and more favorably $-50\times10^{-6} \leq \alpha \leq 30\times 10^{-6}$, it is possible to set the temperature coefficient α of the dielectric constant of the highly dielectric elastomer composition to $-1500\times10^{-6} < \alpha < 100\times10^{-6}$, and favorably $-1200\times 10^{-6} < \alpha < 50\times10^{-6}$.

It is unpreferable that the temperature coefficient α of the highly dielectric ceramic powder is less than $-200\times10^{-6}$, because the shift of the resonance frequency with respect to the operating frequency becomes larger than±10%, when the highly dielectric ceramic powder is used as the material of the antenna.

As the elastomer of the highly dielectric elastomer composition of the present invention, it is possible to use natural rubber and/or synthetic rubber.

As elastomers consisting of the natural rubber, it is possible to list graft modified rubber formed by grafting a double bond of natural rubber, chlorinated rubber, rubber hydrochloride, cyclized rubber, maleic rubber or hydrogenated rubber with a vinyl monomer such as methyl methacrylate, acrylonitrile or ester methacrylate; a block polymer formed by kneading the natural rubber in the presence of a monomer in nitrogen current. In addition to the natural rubber, it is possible to list elastomers containing synthetic cis-1,4-polyisoprene as a material thereof.

As elastomers consisting of the synthetic rubber, it is possible to list elastomer of the polyolefin family such as isobutylene rubber, ethylene propylene rubber, ethylene propylene diene rubber, ethylene propylene terpolymer, chlorosulfonated polyethylene rubber, and the like; elastomers of the styrene family such as styrene-isoprene-styrene block copolymer (SIS), styrene-butadiene-styrene copolymer (SBS), styrene-ethylene-butylene-styrene block copolymer (SEBS), and the like; isoprene rubber, urethane rubber, epichlorohidrin rubber, silicone rubber, nylon 12, butyl rubber, butadiene rubber, polynorbornane rubber, acrylonitrile-butadiene rubber, and the like.

These elastomers can be used singly or by mixing two or more kinds thereof. One or more kinds of thermoplastic resins can be used in combination with these elastomers within a range in which the elasticity of the elastomers do not deteriorate. When the elastomer consisting of the natural rubber and/or one or more kinds of a synthetic non-polar elastomer are used as the elastomer of the present invention, a highly dielectric elastomer excellent in its electrical insulating property can be obtained. Thus it is possible to preferably apply the highly dielectric elastomer to a use demanded to have insulating property. As the synthetic non-polar elastomer, it is possible to list ethylene propylene rubber (hereinafter referred to as EPDM), ethylene propylene diene rubber, isobutylene rubber, isoprene rubber, silicone rubber, and the like. Because the EPDM and the ethylene propylene diene rubber have a very low dielectric loss tangent respectively, they can be preferably used for electronic parts such as an antenna and a sensor.

As the highly dielectric ceramic powder which can be used in the present invention, it is preferable to use ceramic powder consisting of a metal salt of titanic acid in which at least one kind of the rare earth metal such as neodymium (Nd), lanthanum (La), and the like, and one or not less than two metal elements selected from among barium (Ba), strontium (Sr), calcium (Ca), magnesium (Mg), cobalt (Co), palladium (Pd), zinc (Zn), beryllium (Be), cadmium (Cd), and bismuth (Bi). The rare earth metals such as Nd, La contribute to the improvement of a temperature characteristic that the dielectric constant makes a low degree of change with a temperature change. Metal elements such as Ba, Sr enhance the permittivity and decrease the dielectric loss tangent. That is, they contribute to the improvement of the dielectric characteristic. As preferable highly dielectric ceramic powder, barium titanate.neodymium ceramic powder containing Ti, Ba, Nd, and Bi can be used.

It is preferable that the particle diameter of the ceramic powder having a high permittivity and a low dielectric loss tangent is 0.01 to 100 μm. It is unpreferable that the average particle diameter is less than 0.01 μm, because the ceramic powder scatters at a measuring time and hence it is difficult to treat the ceramic powder. It is unpreferable that the average particle diameter of the ceramic powder is more than 100 μm, because there is a fear that a variation of the dielectric characteristic is caused inside the molding. A more practicable range is 0.1 to 20 μm.

It is preferable that as the characteristic of the ceramic powder, the dielectric constant thereof is not less than seven, and the dielectric loss tangent thereof is not more than 0.01.

It is preferable that at a frequency of 1 GHz and a temperature of 25° C., the dielectric constant of the highly dielectric elastomer composition is not less than seven and the dielectric loss tangent thereof is not more than 0.01. It is unpreferable that the dielectric constant of the highly dielectric elastomer composition is less than seven, because the effect of decreasing the wavelength of a signal propagating in a material of an electronic part is and thus it is impossible to make a product compact. It is unpreferable that the dielectric loss tangent of the highly dielectric elastomer composition is more than 0.01, because a loss inside the material of the electronic part is large. The material of the electronic part can be used in a high-frequency band of not less than 100 MHz.

The mixing ratio of the highly dielectric ceramic powder is so selected as to keep the dielectric constant of the highly dielectric elastomer composition at not less than seven, the dielectric loss tangent thereof at not more than 0.01, set the temperature coefficient α of the dielectric constant thereof to the range of $-1500\times10^{-6} < \alpha < 100\times10^{-6}$, and allow the highly dielectric elastomer composition to have a moldability to such an extent that the highly dielectric elastomer composition can be formed into an electronic part such as an antenna.

For example, the mixing amount of the highly dielectric ceramic powder is 300 to 1200 parts by weight (phr) per 100 parts by weight (phr) of the elastomer.

In addition to the above-described essential components, in a range in which the effect of the present invention is not interfered, the highly dielectric elastomer composition which can be used in the present invention is capable of containing (1): a coupling agent such as a silane-containing coupling agent, a titanate-containing coupling agent, a zirconia-aluminate-containing coupling agent for improving affinity and cementing performance in the interface of the elastomer and the ceramic powder and improving the mechanical strength of the highly dielectric elastomer composition, (2): a filler consisting of fine particles such as talc, calcium pyrophosphate, and the like for improving plating performance for forming an electrode, (3): an antioxidant for improving heat stability thereof to a high extent, (4): a light stabilizer such as an ultraviolet light absorber for improving light resistance thereof, (5): a halogen-containing fire-retardant assistant or a phosphorus-containing fire-retardant assistant for improving the fire-retardant property thereof, (6): a shock resistance-imparting agent for improving shock resistance thereof to a high extent, (7) a coloring agent such as dye, pigment, and the like, (8): a crosslinking agent such as plasticizer, sulfur, peroxide, and the like for adjusting the property thereof, and (9): a vulcanization-accelerating agent.

In the range in which the effect of the present invention is not interfered, the highly dielectric elastomer composition of the present invention is capable of containing fibers of an alkali metal salt of titanic acid such as glass fiber, a whisker of potassium titanate, and the like; fibers of a metal salt of boric acid such as fibers of titanium oxide, a whisker of magnesium borate, a whisker of aluminum borate, and the like; fibers of a metal salt of silicic acid such as a whisker of zinc silicate, a whisker of magnesium silicate; and organic and inorganic fillers such as carbon fibers, alumina fibers, aramid fibers, and the like.

The method of producing the highly dielectric elastomer composition of the present invention is not limited to a specific method, but it is possible to use various mixing and molding methods. For example, it is preferable to use a method of producing the highly dielectric elastomer composition by kneading the components thereof with using a biaxial extruder. The highly dielectric elastomer composition may be directly formed into a product by injection molding, extrusion molding, and the like or formed into a to-be-molded material such as a pellet, a rod-shaped material, a plate-shaped material, and the like.

The method of producing the dielectric antenna of the present invention from the highly dielectric elastomer composition is not limited to a specific method either, but it is possible to use the above-described various mixing and molding methods. To improve adhesion of the plated copper foil or conductive paste to the material of the antenna, the surface of the material of the antenna may be roughened with sand paper or blast treatment or surface-treated by etching with a solvent, UV etching, plasma etching, application of a primer, and the like.

The dielectric antenna of the present invention is obtained by bonding a copper foil plated as an electrode to the molding of the highly dielectric elastomer composition formed as the body thereof or by bonding the conductive paste to the molding by screen printing.

The dielectric antenna of the present invention is described below with reference to FIG. 1. FIG. 1 is a perspective view of the dielectric antenna (patch antenna). In a dielectric antenna 1, an electrode 3 which is a radiant element is formed at a central portion of an upper surface of a dielectric substrate 2. A power supply pin 5 is mounted at a predetermined position of the electrode 3. As the method of forming the electrode 3, metal plating treatment and bonding of a metal foil can be used.

A grounding conductor 4 is formed on a lower surface of the dielectric substrate 2. The power supply pin 5 is electrically connected to an amplifying circuit or an originating circuit (not shown). A high-frequency signal is supplied to the electrode 3 through the power supply pin 5. It is possible to use a construction in which the power supply pin 5 is not used, but a power supply line or the like extended from the electrode 3 is utilized.

In obtaining the electrode by bonding the plated copper foil to the antenna body, a material to be plated on the copper foil is not limited to a specific material so long as the material to be plated is capable of holding conductivity to such an extent that the antenna performs its function. Gold (Au), platinum (Pt), silver (Ag), nickel (Ni), and tin (Sn) can be used. Above all, Ni and Ag are preferable because they are excellent in the oxidation resistance and conductivity thereof. Ni is especially preferable because it is inexpensive. The deposit thickness is favorably 0.1 to 5 µm and more favorably 0.5 to 3 µm. It is unpreferable that the deposit thickness is less than 0.1 µm, because the degree of improvement of the oxidation resistance is low. It is unpreferable that the deposit thickness is more than 5 µm, because the deposit thickness becomes non-uniform and there is an increase in a necessary amount of the material to be plated.

Plating treatment includes an electroless plating method, an electroplating method, and a combination of these methods. The electroless plating method is preferable because the electroless plating method can be carried out easily and the deposit thickness is uniform.

In the electroless plating method, a plating solution obtained by dispersing nickel sulfate, a complexing agent, a stabilizer, a PH buffer, an appearance-adjusting agent, and a dispersing agent in a reducing bath of hypophosphite is heated to not less than about 80° C. Thereafter a metal plate is immersed in the plating solution to form a plated layer. In the electroless plating method, after a plated portion of the metal plate is degreased and pickled, plating treatment is carried out.

To bond the copper foil to the molding of the elastomer, it is possible to use an epoxy or urethane bonding film and a liquid adhesive agent. It is preferable that the thickness of the adhesive layer is 1 to 100 µm. It is unpreferable that the thickness of the adhesive layer is less than 1 µm, because the adhesive layer is incapable of being locally present and hence an adhesive area is small. It is unpreferable that the thickness of the adhesive layer is more than 100 µm, because the dielectric characteristic (particularly, dielectric loss tangent) of the molding of the elastomer deteriorates. A more practicable range falls in 20 to 50 µm.

It is possible to insert the copper foil into a die to bond the copper foil to the elastomer by utilizing a pressure at a time of molding when the elastomer is vulcanized.

By using the plated copper foil as the electrode of the dielectric antenna composed of the elastomer, as described above, the electrode has favorable adhesion to the molding of the elastomer and an excellent resistance to oxidation.

An embodiment of obtaining the electrode by screen-printing by using the conductive paste is described below with reference to FIGS. 2 and 3. In the dielectric antenna 1, a dielectric substrate 2 is formed from a composition containing the elastomer and the highly dielectric ceramic powder mixed therewith, and a conductive paste 6 is screen-printed on the dielectric substrate 2 to form an electrode 3. The above-described composition has the dielectric constant of not less than seven and the dielectric loss tangent of not more than 0.01. The electrode 3 at the ground side and at the radiant side is formed on the front and rear portions of the dielectric substrate 2. The dielectric antenna 1 is formed as a patch antenna.

As shown in FIG. 2, in the above-described screen printing, in a state where a screen 7 whose periphery is reinforced with a print frame 10 is layered on the dielectric substrate 2 on which the conductive paste 6 is to be printed, the conductive paste 6 is applied from the reverse of the screen 7 to the dielectric substrate 2 by a squeegee 11. The screen 7 is constructed of a shielding plate 8 on which a transmission portion 8a is selectively formed and a reticulate portion 9 disposed entirely on the lower surface of the shielding plate 8. The conductive paste 6 applied to the dielectric substrate 2 by the squeegee 11 permeates the transmission portion 8a of the shielding plate 8 and is printed selectively on the upper surface of the dielectric substrate 2 to form the electrode 3.

A conductive material contained in the conductive paste to be used is not limited to a specific material so long as the conductive material is capable of holding conductivity to such an extent that the antenna performs its function. For example, Au, Pt, Ag, Ni, and Sn can be used. Above all, Ag is especially preferable because it is excellent in the resistance to oxidation and the conductivity thereof. Ni is also especially preferable because it is in expensive. The diameter of particles of the conductive material to be contained in the conductive paste is favorably 0.05 to 30 μm and more favorably 1 to 10 μm. It is difficult to treat fine particles whose diameter is less than 0.05 μm. It is unpreferable that the diameter of the fine particles is more than 30 μm because the thickness of the electrode is large and there is an increase in a necessary amount of the material to be used. It is unpreferable that the conductive paste is printed thickly because the thickness of a screen-printed layer is liable to be nonuniform and the volume resistivity changes.

The mixing amount of the conductive material to be contained in the conductive paste is favorably 50 to 97 wt %. In this case, the mixing amount of a binder is 3 to 50 wt %. The mixing amount of the conductive material is more favorably 70 to 90 wt %. The remainder is the mixing amount of the binder. It is unpreferable that the mixing amount of the conductive material is less than 50 wt %, because the electrode is incapable of securing conductivity to such an extent that the electrode performs its function. It is unpreferable that the mixing amount of the conductive material is more than 97 wt % because the mixing amount of the binder is small and hence the electrode has a low degree of adhesion to the calcined material of the antenna and there is a possibility that the electrode cracks.

In the case of the conductive paste containing Ag used as the conductive material thereof, the binder to be used is not limited to a specific kind, but the binder such as epoxy resin, butyral resin, polyester resin, and the like generally used can be used. Above all, epoxy-modified resin is especially preferable because it has favorable adhesion to the material of the antenna. The volume resistivity of the electrode is not limited to a specific value, provided that the volume resistivity thereof falls in a range in which the function of the antenna is not interfered. The volume resistivity of the electrode is favorably less than $10^{-2}$ Ω·cm. It is unpreferable that the volume resistivity of the electrode is more than $10^{-2}$ Ω·cm, because the conductivity of the electrode falls greatly and thereby the resonance frequency of the antenna shifts greatly and VSWR (voltage standing wave ratio) deteriorates. The volume resistivity of the electrode is more favorably less than $10^{-3}$ Ω·cm.

EXAMPLES

The dielectric constant and dielectric loss tangent of the molding of the highly dielectric elastomer composition obtained in each example and comparison example and the temperature coefficient α of the dielectric constant of the molding thereof were measured by the following method.

Test Method 1: Measurement of Dielectric Constant and Dielectric Loss Tangent at 25° C.

The molding obtained by molding the highly dielectric elastomer composition thermally and compressingly was processed into long and narrow specimens each having a dimension of 1.5 mm×1.5 mm×80 mm. By carrying out a cavity resonator method (pages 16 to 19 of magazine, "Electronic Monthly" published in July of 1998), the dielectric constant and dielectric loss tangent of each specimen were measured at 25° C. in 1 GHz band.

Test Method 2: Measurement of Dielectric Constant at Each Temperature and Temperature Coefficient α of Dielectric Constant The molding of the highly dielectric elastomer composition was processed into specimens each having a predetermined configuration and a dimension of φ25 mm×t 1.5 mm. By carrying out a volumetric method, the dielectric constant at −40° C., 25° C., at 100° C. and the temperature coefficient α of the dielectric constant were measured. A measuring apparatus used in the volumetric method was RF impedance/material analyzer HP4291B (produced by Agilent Technologies, Inc.). An electrode used was HP16453A (produced by Agilent Technologies, Inc.).

Examples 1 Through 3

In each of the examples 1 through 3, EPDM, ceramic powder of barium titanate.neodymium ("HF-120" produced by KCM Corporation Co., Ltd., dielectric constant: 120) in which the temperature coefficient α of the dielectric constant was −100×10$^{-6}$, a vulcanization-accelerating agent, and a processing aid were mixed with one another at mixing ratios shown in table 1 to obtain a molding of each example having a dimension of 80 mm×80 mm×1.5 mm by thermal and compression molding. The vulcanizing condition was 170° C.×30 minutes in each example. The vulcanization-accelerating agent, the processing aid, and the like used were one part by weight (phr) of stearic acid ("LUNAC S-30" produced by Kao Corporation), five parts by weight (phr) of zinc oxide ("META-Z L-40" produced by INOUE CALCIUM CO., LTD.), three parts by weight (phr) of a processing aid ("SPLENDER R-100" produced by Kao Corporation), 2.5 parts by weight (phr) of a vulcanization-accelerating agent ("Soxinol M" produced by Sumitomo Chemical Co., Ltd.), and 1.5 parts by weight (phr) of sulfur ("GOLDEN FLOWER SULFUR POWDER" produced by Tsurumi Chemical Co., Ltd.).

The dielectric constant and dielectric loss tangent of each of the obtained moldings were measured by the test method 1. The dielectric constant and the temperature coefficient α of the dielectric constant at each temperature were measured by the test method 2. Table 1 shows the results of the measurement.

Examples 4 Through 6

Moldings were obtained in the same condition and method as those of the example 1 except that the ceramic powder of the barium titanate.neodymium of the example 1 in which the temperature coefficient α of the dielectric constant was 100×10$^{-6}$ was replaced with the ceramic powder of the barium titanate.neodymium (HF-100 produced by KCM Corporation Co., Ltd., dielectric constant: 100) in which the temperature coefficient α of the dielectric constant was −40×10$^{-6}$.

The obtained moldings were evaluated in the same condition as that of the example 1. Table 1 shows the results of the measurement.

TABLE 1

| | Mixing amount | | | | | Dielectric characteristic of molding | | | | | Temperature coefficient of dielectric constant (25 to 100° C.) |
|---|---|---|---|---|---|---|---|---|---|---|---|
| | EPDM Mixing amount | Vulcanization-accelerating agent, Processing aid Mixing amount | Ceramic powder | | | Dielectric | | Dielectric constant (Volumetric method: 1 GHz) | | | |
| | | | Mixing amount | Name of powder | Dielectric constant | Temperature coefficient of dielectric constant | Dielectric constant (Cavity resonator method: 1 GHz) | loss tangent | | | | |
| Example | phr | phr | phr | | 25° C. | $\times 10^{-6}/°$ C. | 25° C. | | −40° C. | 25° C. | 100° C. | $\times 10^{-6}/°$ C. |
| 1 | 100 | 13 | 400 | HF-120 | 120 | −100 | 10 | 0.002 | 10.9 | 10 | 9.1 | −1200 |
| 2 | 100 | 13 | 800 | HF-120 | 120 | −100 | 16 | 0.002 | 17.5 | 16 | 14.6 | −1200 |
| 3 | 100 | 13 | 1000 | HF-120 | 120 | −100 | 20 | 0.003 | 21.8 | 20 | 18.2 | −1200 |
| 4 | 100 | 13 | 400 | HF-100 | 100 | −40 | 8 | 0.002 | 8.7 | 8 | 7.4 | −1067 |
| 5 | 100 | 13 | 800 | HF-100 | 100 | −40 | 14 | 0.002 | 15.3 | 14 | 12.9 | −1067 |
| 6 | 100 | 13 | 1000 | HF-100 | 100 | −40 | 17 | 0.003 | 18.6 | 17 | 15.6 | −1067 |

As shown in the examples 1 through 3, the dielectric constant of each molding at 25° C. was not less than seven, the dielectric loss tangent thereof was not more than 0.01, and the temperature coefficient α of the dielectric constant thereof was −1200×10$^{-6}$. As shown in the examples 4 through 6, the dielectric constant of each molding at 25° C. was not less than seven, the dielectric loss tangent thereof was not more than 0.01, and the temperature coefficient of the dielectric constant thereof was −1067×10$^{-6}$. These values show a high permittivity and a low dielectric loss tangent respectively. The temperature coefficients α of the dielectric constant of the moldings were larger than −1500×10$^{-6}$. Thus the shift of the resonance frequency when the highly dielectric elastomer compositions were used for the material of an antenna fell within ±10%. Thus the moldings are excellent as the material of the antenna.

Comparison Examples 1 Through 3

In each of the comparison examples 1 through 3, the EPDM, ceramic powder of strontium titanate ("ST-NAS" produced by KCM Corporation Co., Ltd., dielectric constant: 180) in which the temperature coefficient α of the dielectric constant was −1200×10$^{-6}$, the vulcanization-accelerating agent, and the processing aid were mixed with one another at mixing ratios shown in table 2 to obtain moldings each having a dimension of 80 mm×80 mm×1.5 mm. The vulcanizing condition was 170° C.×30 minutes. The vulcanization-accelerating agent and the processing aid used were identical to those of the example 1.

The dielectric constant and dielectric loss tangent of each of the obtained moldings were measured by the test method 1. The dielectric constant and the temperature coefficient α of the dielectric constant at each temperature were measured by the test method 2. Table 2 shows the results of the measurement.

Comparison Examples 4 Through 6

The molding of each comparison example was obtained in the same condition and method as those of the comparison example 1 except that the ceramic powder of the strontium titanate of the comparison example 1 in which the temperature coefficient α of the dielectric constant was −1200×10$^{6}$ was replaced with ceramic powder of barium titanate powder (BT-32 produced by FUJI TITANIUM INDUSTRY CO., LTD., dielectric constant: 4000) in which the temperature coefficient α of the dielectric constant was −2000×10$^{-6}$.

The obtained moldings were evaluated in the same condition as that of the example comparison 1. Table 2 shows the results of the measurement.

TABLE 2

| | Mixing amount | | | | | Dielectric characteristic of molding | | | | | Temperature coefficient of dielectric constant (25 to 100° C.) |
|---|---|---|---|---|---|---|---|---|---|---|---|
| | EPDM Mixing amount | Vulcanization-accelerating agent, Processing aid Mixing amount | Ceramic powder | | | Dielectric | | Dielectric constant (Volumetric method: 1 GHz) | | | |
| Comparison | | | Mixing amount | Name of powder | Dielectric constant | Temperature coefficient of dielectric constant | Dielectric constant (Cavity resonator method: 1 GHz) | loss tangent | | | | |
| Example | phr | phr | phr | | 25° C. | $\times 10^{-6}/°$ C. | 25° C. | | −40° C. | 25° C. | 100° C. | $\times 10^{-6}/°$ C. |
| 1 | 100 | 13 | 300 | ST-NAS | 180 | −1200 | 10 | 0.003 | 12.0 | 10 | 8.0 | −2667 |
| 2 | 100 | 13 | 600 | ST-NAS | 180 | −1200 | 20 | 0.004 | 24.0 | 20 | 16.0 | −2667 |
| 3 | 100 | 13 | 900 | ST-NAS | 180 | −1200 | 30 | 0.005 | 36.0 | 30 | 24.0 | −2667 |
| 4 | 100 | 13 | 400 | BT32 | 4000 | −2000 | 15 | 0.031 | 18.8 | 15 | 11.3 | −3333 |

TABLE 2-continued

| | | Mixing amount | | | | | Dielectric characteristic of molding | | | | | Temperature coefficient of dielectric constant (25 to 100° C.) |
|---|---|---|---|---|---|---|---|---|---|---|---|---|
| | | Vulcanization- | | Ceramic powder | | | | | Dielectric | | | |
| Comparison Example | EPDM Mixing amount | accelerating agent, Processing aid Mixing amount | Mixing amount | Name of powder | Dielectric constant | Temperature coefficient of dielectric constant | Dielectric constant (Cavity resonator method: 1 GHz) | loss tangent | Dielectric constant (Volumetric method: 1 GHz) | | | |
| | phr | phr | phr | | 25° C. | ×10$^{-6}$/° C. | 25° C. | | −40° C. | 25° C. | 100° C. | ×10$^{-6}$/° C. |
| 5 | 100 | 13 | 800 | BT32 | 4000 | −2000 | 30 | 0.032 | 37.5 | 30 | 22.5 | −3333 |
| 6 | 100 | 13 | 1000 | BT32 | 4000 | −2000 | 40 | 0.034 | 50.0 | 40 | 30.0 | −3333 |

As shown in the comparison examples 1 through 3, the dielectric constant of each molding at 25° C. was not less than seven, the dielectric loss tangent thereof was not more than 0.01, and the temperature coefficient α of the dielectric constant was −2667×10$^{-6}$ which was smaller than −1500×10$^{-6}$. Thus a shift generated when the molding is used as the material of an antenna cannot be kept within±10% of the operating frequency.

As shown in the comparison examples 4 through 6, the dielectric constant of each molding at 25° C. was not less than seven, the dielectric loss tangent thereof was more than 0.01, and the temperature coefficient α of the dielectric constant was −3333×10$^{-6}$ which was smaller than ~1500×10$^{-6}$. Thus a shift generated when the molding is used as the material of an antenna cannot be kept within±10% of the operating frequency.

The characteristic of a dielectric antenna obtained in each of the examples and the comparison examples shown below was examined by the following method.

Test Method 3 (Cavity Resonator Method): Measurement of Dielectric Constant and Dielectric Loss Tangent at 25° C.

The test method 3 was carried out in a manner similar to that of the test method 1.

Test Method 4: Measurement of Characteristic of Antenna

By using obtained patch antennas, the resonance frequency and the VSWR (voltage standing wave ratio) were measured by using a network analyzer. A gain in each resonance frequency was also measured in comparison with a reference antenna whose gain was known. Antennas satisfying the condition of VSWR<2 and gain>2 dBi were marked by "good". Antennas which did not satisfy this condition were marked by "poor".

Test Method 5: Measurement of Change in Characteristic of Antenna

An aging test was conducted on the obtained antennas at 100° C. for 500 hours to measure the change in the characteristic (resonance frequency, gain) thereof.

Examples 7 Through 9

In each of the examples 7 through 9, the ceramic powder of the barium titanate.neodymium ("HF-120" produced by KCM Corporation Co., Ltd., dielectric constant: 120) and small amount of additives including the vulcanization-accelerating agent and the processing aid were mixed with the EPDM at mixing ratios shown in table 3 to obtain a molding of each example having a dimension of 80 mm×80 mm×2 mm by thermal compression molding. The vulcanizing condition was 170° C.×30 minutes. The vulcanization-accelerating agent and the processing aid used were one part by weight (phr) of the stearic acid ("LUNAC S-30" produced by Kao Corporation), five parts by weight (phr) of the zinc oxide ("META-Z L-40" produced by INOUE CALCIUM CO., LTD.), three parts by weight (phr) of the processing aid ("SPLENDER R-100" produced by Kao Corporation), 2.5 parts by weight (phr) of the vulcanization-accelerating agent ("Soxinol M" produced by Sumitomo Chemical Co., Ltd.), and 1.5 parts by weight (phr) of the sulfur ("GOLDEN FLOWER SULFUR POWDER" produced by Tsurumi Chemical Co., Ltd.).

The dielectric constant and dielectric loss tangent of each of the obtained moldings (antenna member) were measured by the test method 3. Table 3 shows the results of the measurement.

A nickel-plated copper foil was bonded to both surfaces of each molding with an epoxy adhesive film (40 μm) by applying heat and pressure thereto to obtain a sheet of each example having a dimension of 60 mm×60 mm×2 mm. By using the material of an antenna, a patch antenna adapted to 2450 MHz was prepared. A power supply position and the configuration of the electrode of the antenna on the radiant surface thereof were selected according to the dielectric constant of the material of each antenna. An unnecessary portion was removed by etching. The etching was carried out by printing a resist of an electrode pattern and by using a solution of ferric chloride.

Table 3 shows the kind of the electrode of each antenna, the deposit thickness, and the thickness of the copper foil. The property of each antenna was measured by the test method 4. Table 4 shows the results. The change in the property of each antenna was measured by the test method 5. Table 4 shows the results.

In the examples 7 through 9, instead of nickel plating, Ag paste ("SILCOAT RF200" produced by FUKUDA METAL FOIL & POWDER CO., LTD.) was screen-printed on both surfaces of each molding in the same condition. After printing was conducted in a predetermined configuration on a surface of each of the moldings, they were dried at 80° C. for 30 minutes. Thereafter the moldings were calcined at 150° C. for 30 minutes. Table 3 shows the thickness of the electrode of each antenna and the volume resistivity thereof. The property of each antenna was measured by the test method 3. Table 4 shows the results. The change of the property of each antenna was measured by the test method 4. Table 4 shows the results.

Examples 10 Through 12

In each of the examples 10 through 12, the ceramic powder of the strontium titanate ("ST-NAS" produced by KCM Corporation Co., Ltd., dielectric constant: 180) and small amount of additives including the vulcanization-accelerating agent and the processing aid were mixed with the EPDM at mixing ratios shown in table 3 to obtain a molding of each example having a dimension of 80 mm×80 mm×2 mm by carrying out thermal compression molding. The vulcanizing condition was 170° C.×30 minutes. The vulcanization-accelerating agent and the processing aid used were identical to those of the example 7.

The dielectric constant and dielectric loss tangent of each of the obtained moldings were measured by the test method 3. Table 3 shows the results of the measurement.

A silver-plated copper foil was bonded to both surfaces of each molding with an epoxy adhesive film (40 µm) by applying heat and pressure thereto to obtain a sheet of each example having a dimension of 60 mm×60 mm×2 mm. By using the material of an antenna, a patch antenna adapted to 2450 MHz was prepared. A power supply position and the configuration of the electrode of the antenna on the radiant surface thereof were selected according to the dielectric constant of the material of each antenna. An unnecessary portion was removed by etching. The etching was carried out by printing a resist of an electrode pattern and by using the solution of the ferric chloride.

Table 3 shows the kind of the electrode of each antenna, the deposit thickness, and the thickness of the copper foil. The property of each antenna was measured by the test method 4. Table 4 shows the results. The change in the property of each antenna was measured by the test method 5. Table 4 shows the results.

In the examples 10 through 12, instead of silver plating, Ag paste ("SILCOAT RF200" produced by FUKUDA METAL FOIL & POWDER CO., LTD.) was screen-printed on both surfaces of the molding in the same condition. After printing was conducted in a predetermined configuration on a surface of each of the moldings, they were dried at 80° C. for 30 minutes. Thereafter the moldings were calcined at 150° C. for 30 minutes. Table 3 shows the thickness of the electrode of each antenna and the volume resistivity thereof. The property of each antenna was measured by the test method 3. Table 4 shows the results. The change in the property of each antenna was measured by the test method 5. Table 4 shows the results.

TABLE 3

| Example | EPDM Mixing amount phr | Ceramic Name of powder | Ceramic Mixing amount phr | Vulcanization-accelerating agent, Processing aid phr | Dielectric characteristic of material of the antenna Dielectric constant | Dielectric characteristic of material of the antenna Dielectric loss tangent | Electrode | Thickness Deposit thickness µm | Thickness of copper foil µm | Electrode-forming method | Film thickness µm | Volume resistivity Ω · cm |
|---|---|---|---|---|---|---|---|---|---|---|---|---|
| 7 | 100 | HF-120 | 400 | 13 | 10 | 0.002 | Ni-plated copper foil | 0.5 | 35 | Screen printing | 11 | $1.2 \times 10^{-4}$ |
| 8 | 100 | HF-120 | 800 | 13 | 16 | 0.002 | Ni-plated copper foil | 1 | 35 | Screen printing | 12 | $9.2 \times 10^{-5}$ |
| 9 | 100 | HF-120 | 1000 | 13 | 20 | 0.003 | Ni-plated copper foil | 3 | 35 | Screen printing | 12 | $8.9 \times 10^{-5}$ |
| 10 | 100 | ST NAS | 300 | 13 | 10 | 0.003 | Ag-plated copper foil | 0.5 | 12 | Screen printing | 10 | $1.1 \times 10^{-4}$ |
| 11 | 100 | ST NAS | 600 | 13 | 20 | 0.004 | Ag-plated copper foil | 1 | 35 | Screen printing | 11 | $9.1 \times 10^{-5}$ |
| 12 | 100 | ST NAS | 900 | 13 | 30 | 0.005 | Ag-plated copper foil | 3 | 70 | Screen printing | 12 | $8.1 \times 10^{-5}$ |

TABLE 4

| | Characteristic of antenna | | | | Characteristic of antenna after heat treatment at 100° C. for 500 hours | | | |
|---|---|---|---|---|---|---|---|---|
| Example | Resonance frequency MHz | VSWR | Gain dBi | Judgement | Resonance frequency MHz | VSWR | Gain dBi | Judgement |
| 7 | 2451 | 1.1 | 6.6 | good | 2448 | 1.2 | 6.6 | good |
| 8 | 2447 | 1.1 | 6 | good | 2448 | 1.2 | 6 | good |
| 9 | 2445 | 1.2 | 5.9 | good | 2451 | 1.3 | 5.9 | good |
| 10 | 2445 | 1.1 | 6 | good | 2450 | 1.2 | 6.5 | good |
| 11 | 2448 | 1.2 | 5.8 | good | 2446 | 1.2 | 5.7 | good |
| 12 | 2450 | 1.2 | 4.3 | good | 2447 | 1.3 | 4.2 | good |

The antennas of the examples 7 through 12 were judged as "good" before and after the aging test was conducted. Thus they can be used practicably.

Comparison Examples 7 Through 9

In each of the comparison examples 7 through 9, the ceramic power of the barium titanate.neodymium ("HF-120" produced by KCM Corporation Co., Ltd., dielectric constant: 120) and small amount of additives including the vulcanization-accelerating agent and the processing aid were mixed with the EPDM at mixing ratios shown in Table 5 to obtain a molding of each comparison example having a dimension of 80 mm×80 mm×2 mm by thermal compression molding. The vulcanizing condition was 170° C.×30 minutes. The vulcanization-accelerating agent and the processing aid used were identical to those of the example 7.

The dielectric constant and dielectric loss tangent of each of the obtained moldings (antenna member) were measured by the test method 3. Table 5 shows the results of the measurement.

An unplated copper foil was bonded to both surfaces of each molding with an epoxy adhesive film (40 μm) by applying heat and pressure thereto to obtain a sheet of each comparison example having a dimension of 60 mm×60 mm×2 mm. By using this material of the antenna, a patch antenna adapted to 2450 MHz was prepared. A power supply position and the configuration of the electrode of the antenna on the radiant surface thereof were selected according to the dielectric constant of the material of each antenna. An unnecessary portion was removed by etching. The etching was carried out by printing a resist of an electrode pattern and by using the solution of the ferric chloride.

Table 5 shows the kind of the electrode of each antenna, and the thickness of the copper foil. The property of each antenna was measured by the test method 4. Table 6 shows the results. The change of the property of each antenna was measured by the test method 5. Table 6 shows the results.

In the comparison examples 7 through 9, instead of plating treatment, Ag paste ("SILCOAT RF200" produced by FUKUDA METAL FOIL & POWDER CO., LTD.) was screen-printed on both surfaces of each molding in the same condition. After printing was conducted in a predetermined configuration on a front portion of each of the moldings, they were dried at 80° C. for 30 minutes. Thereafter the moldings were calcined at 150° C. for 30 minutes. The property of each antenna was measured by the test method 3. Table 6 shows the results. The change of the property of each antenna was measured by the test method 4. Table 6 shows the results.

TABLE 5

| Comparison Example | EPDM Mixing amount phr | Ceramic Name of powder | Ceramic Mixing amount phr | Vulcanization-accelerating agent, Processing aid phr | Dielectric characteristic of material of antenna (Cavity resonator method) Dielectric constant | Dielectric characteristic of material of antenna (Cavity resonator method) Dielectric loss tangent | Electrode-forming method | Thickness of copper foil μm |
|---|---|---|---|---|---|---|---|---|
| 7 | 100 | HF-120 | 400 | 13 | 10 | 0.002 | Copper foil | 35 |
| 8 | 100 | HF-120 | 800 | 13 | 16 | 0.002 | Copper foil | 35 |
| 9 | 100 | HF-120 | 1000 | 13 | 20 | 0.003 | Copper foil | 35 |
| 10 | 100 | ST NAS | 300 | 13 | 10 | 0.003 | Copper plating | — |
| 11 | 100 | ST NAS | 600 | 13 | 20 | 0.004 | Copper plating | — |
| 12 | 100 | ST NAS | 900 | 13 | 30 | 0.006 | Copper plating | — |

TABLE 6

| Comparison Example | Characteristic of antenna Resonance frequency MHz | Characteristic of antenna VSWR | Characteristic of antenna Gain dBi | Characteristic of antenna Judgement | Characteristic of antenna after heat treatment at 100° C. for 500 hours Resonance frequency MHz | Characteristic of antenna after heat treatment at 100° C. for 500 hours VSWR | Characteristic of antenna after heat treatment at 100° C. for 500 hours Gain dBi | Characteristic of antenna after heat treatment at 100° C. for 500 hours Judgement |
|---|---|---|---|---|---|---|---|---|
| 7 | 2448 | 1.1 | 6 | good | 2435 | 2.6 | 1.9 | poor |
| 8 | 2445 | 1.2 | 5.8 | good | 2431 | 2.7 | 1.8 | poor |
| 9 | 2453 | 1.2 | 4.3 | good | 2437 | 2.6 | 1.8 | poor |

The antennas of the comparison examples 7 through 12 were judged as "good" before the aging test was conducted, but after the aging test finished, VSWR>2 and gain<2 dBi. Therefore they had inferior characteristics and unpreferable.

INDUSTRIAL APPLICABILITY

By mixing the highly dielectric ceramic powder whose dielectric constant is dependent on temperature to a low extent with the elastomer, the resulting highly dielectric elastomer composition can be preferably utilized as a composite material for electronic parts such as the antenna of a high-frequency communication apparatus which is dependent on temperature to a low extent. Further the electrode of the dielectric antenna is formed by bonding the plated copper foil to the molding of the highly dielectric elastomer composition or by bonding the conductive paste thereto by screen printing. Thereby the antenna whose permittivity is dependent on temperature to a low degree and which is excellent in the resistance to aging can be preferably utilized for a high-frequency communication apparatus.

EXPLANATION OF REFERENCE NUMERALS AND SYMBOLS

Figure 1:
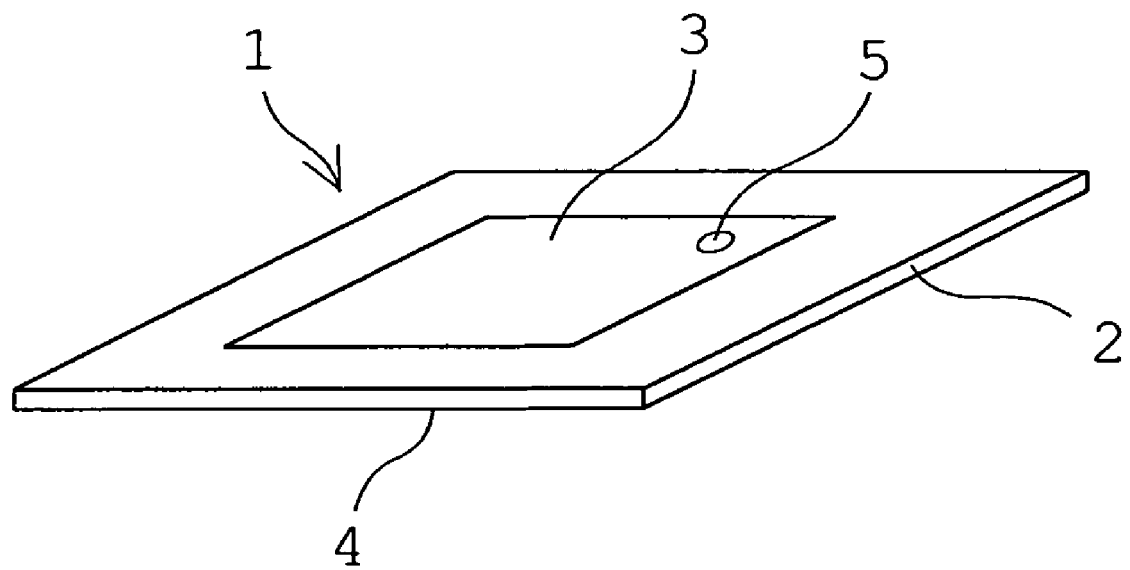
FIG. 1 is a perspective view of a dielectric antenna (patch antenna).
Figure 2:
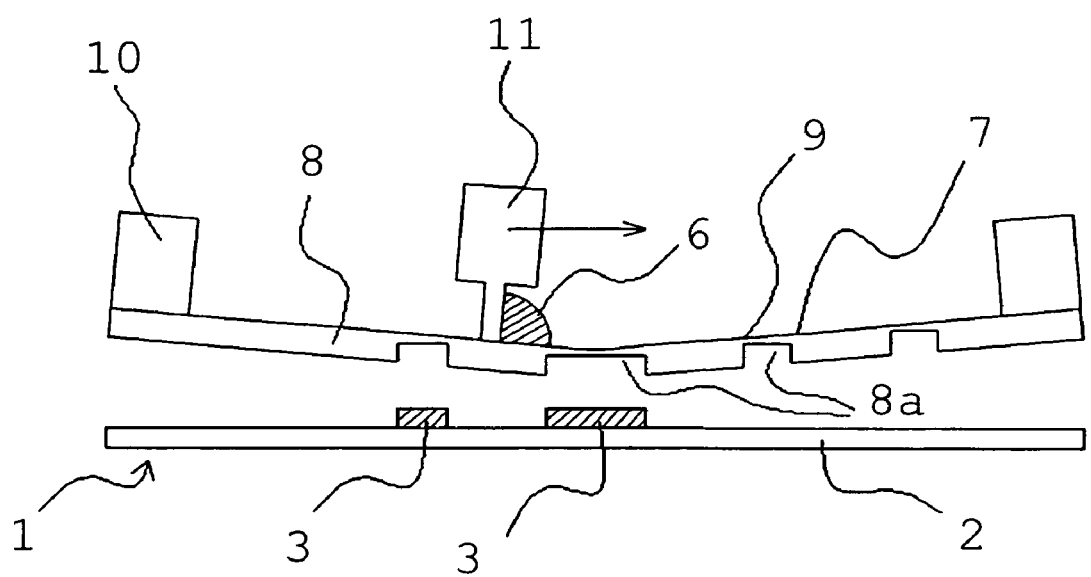
FIG. 2 is an explanatory view for explaining the formation of an electrode by screen printing in a process of producing the dielectric antenna.
Figure 3:
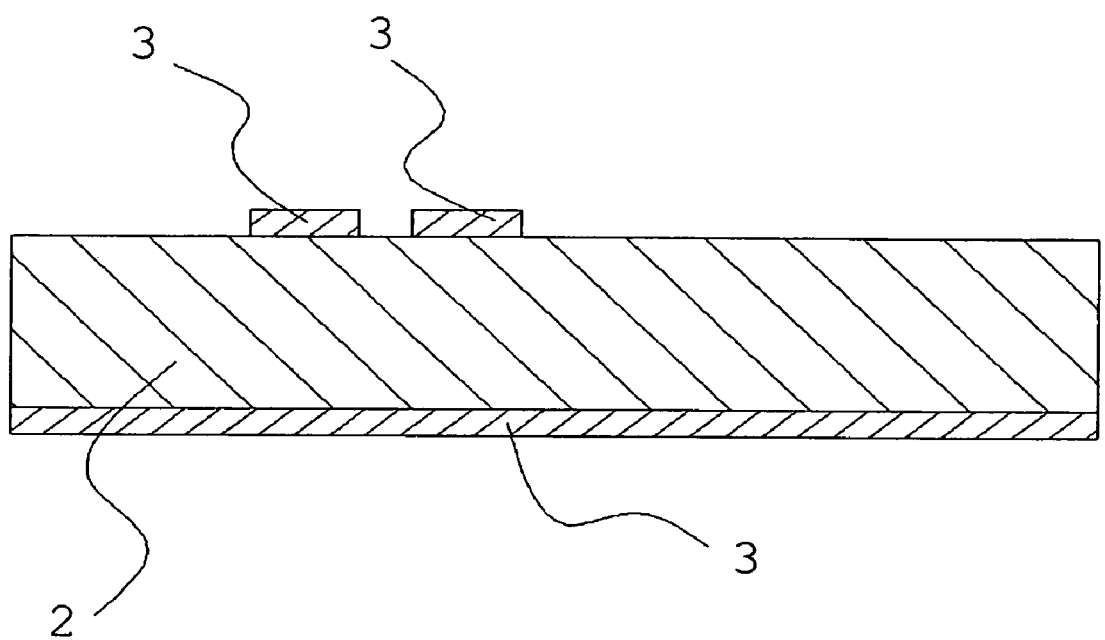
FIG. 3 is a sectional view of the dielectric antenna.

1: dielectric antenna
2: dielectric substrate
3: electrode
4: grounding conductor
5: power supply pin
6: conductive paste
7: screen
8: shielding plate
8a: transmission portion
9: reticulate portion
10: print frame
11: squeegee

The invention claimed is:

1. A highly dielectric elastomer composition comprising an elastomer and a highly dielectric ceramic powder mixed with said elastomer, which is used as a material of an electronic part which treats electric signals having a frequency of not less than 100 MHz wherein the highly dielectric ceramic powder has a temperature coefficient $\alpha$ (unit: 1/° C.) of a dielectric constant of said ceramic powder on 25° C. standard ranging from $-200 \times 10^{-6}$ to $100 \times 10^{-6}$ over a temperature range from −40° C. to 100° C.

wherein said highly dielectric ceramic powder is a barium titanate.neodymium ceramic powder, wherein said elastomer contains a non-polar olefin unit as a constituent unit thereof, wherein at a frequency of 1 GHz and a temperature of 25° C., a dielectric constant of said highly dielectric elastomer composition is not less than seven and a dielectric loss tangent thereof is not more than 0.01.

2. The highly dielectric elastomer composition according to claim 1, wherein said elastomer is an ethylene propylene rubber.

3. The highly dielectric elastomer composition, according to claim 1, which is used as a material of an electronic part which treats electric signals having a frequency of not less than 100 MHz.

4. The highly dielectric elastomer composition according to claim 1, wherein said highly dielectric elastomer composition has a temperature coefficient $\alpha$ (unit: 1/° C.) of said dielectric constant of said elastomer composition on 25° C. standard in a range of $-1500 \times 10^{-6} < \alpha < 100 \times 10^{-6}$ over a temperature range from −40° to 100° C.

5. The highly dielectric elastomer composition according to claim 2, further comprising a crosslinking agent.

* * * * *